United States Patent
Yamamoto et al.

(10) Patent No.: US 8,305,493 B2
(45) Date of Patent: Nov. 6, 2012

(54) RECEIVER, SIGNAL PROCESSING APPARATUS, AND VIDEO DISPLAY APPARATUS

(75) Inventors: Akira Yamamoto, Osaka (JP); Kouji Okamoto, Osaka (JP); Yoshinori Shirakawa, Osaka (JP)

(73) Assignee: Panasonic Corporation, Osaka (JP)

( * ) Notice: Subject to any disclaimer, the term of this patent is extended or adjusted under 35 U.S.C. 154(b) by 12 days.

(21) Appl. No.: 13/101,654

(22) Filed: May 5, 2011

(65) Prior Publication Data

US 2011/0205444 A1 Aug. 25, 2011

Related U.S. Application Data

(63) Continuation of application No. PCT/JP2009/001896, filed on Apr. 24, 2009.

(30) Foreign Application Priority Data

Nov. 6, 2008 (JP) ................................ 2008-285802

(51) Int. Cl.
  *H03L 7/00* (2006.01)
  *H04N 3/27* (2006.01)
  *H04N 5/268* (2006.01)
(52) U.S. Cl. .......................... 348/554; 348/706; 348/537
(58) Field of Classification Search .................. 348/725, 348/726, 554, 555, 558, 706, 536, 537; 710/11, 710/15–18; 375/316; 386/202, 230, 231; 455/132, 230, 255–260, 265, 337
See application file for complete search history.

(56) References Cited

U.S. PATENT DOCUMENTS

| | | | | |
|---|---|---|---|---|
| 4,937,672 A * | 6/1990 | Anderson | ...................... | 348/554 |
| 5,448,201 A * | 9/1995 | Kawabata | ...................... | 329/304 |
| 5,565,929 A * | 10/1996 | Tanaka | .......................... | 348/565 |
| 5,914,797 A * | 6/1999 | Yamamoto et al. | ........... | 348/734 |
| 6,166,594 A * | 12/2000 | Nielsen et al. | ................. | 329/319 |
| 2005/0195894 A1 | 9/2005 | Kim et al. | | |
| 2007/0085933 A1* | 4/2007 | Takagi et al. | ................. | 348/729 |
| 2007/0242160 A1* | 10/2007 | Garg et al. | ..................... | 348/565 |
| 2008/0063216 A1 | 3/2008 | Sakata et al. | | |

FOREIGN PATENT DOCUMENTS

| | | |
|---|---|---|
| JP | 2006-332835 | 12/2006 |
| JP | 2008-092206 | 4/2008 |
| JP | 2008-109711 | 5/2008 |
| JP | 2008-113198 | 5/2008 |
| JP | 2008-153827 | 7/2008 |
| WO | WO 2006/052339 A2 | 5/2006 |

OTHER PUBLICATIONS

WirelessHD Specification Version 1.0 Overview, Oct. 9, 2007.

* cited by examiner

*Primary Examiner* — Victor Kostak
(74) *Attorney, Agent, or Firm* — McDermott Will & Emery LLP

(57) ABSTRACT

A receiver for receiving signals in a plurality of transmission schemes, reducing the circuit size thereof successfully. The receiver for receiving a baseband signal and a modulated signal, includes a first PLL circuit configured to generate a first internal clock based on an external clock synchronized with the baseband signal; a demodulator configured to demodulate the modulated signal to output the demodulated signal; a selector configured to select one of the baseband signal or the demodulated signal; and a first CDR circuit configured to generate a recovered clock and recovered data from the signal selected by the selector, by using the first internal clock.

17 Claims, 7 Drawing Sheets

RECEIVER, SIGNAL PROCESSING APPARATUS, AND VIDEO DISPLAY APPARATUS

CROSS-REFERENCE TO RELATED APPLICATION

This is a continuation of PCT International Application PCT/JP2009/001896 filed on Apr. 24, 2009, which claims priority to Japanese Patent Application No. 2008-285802 filed on Nov. 6, 2008. The disclosures of these applications including the specifications, the drawings, and the claims are hereby incorporated by reference in their entirety.

TECHNICAL FIELD

The present disclosure relates to receivers, and more particularly to receivers for receiving signals in a plurality of transmission schemes.

BACKGROUND

The high-definition multimedia interface (HDMI) has been known as a scheme for transmitting high-definition video data. The HDMI is one of wired communication techniques. For example, International Publication No. 2006/052339 describes a technique for wirelessly transmitting an HDMI signal. WirelessHD Specification Version 1.0 Overview, published in the United States on Oct. 9, 2007, also describes a method in which a high-definition video is transmitted by using radio waves in the 60 GHz band without compression. Also, the standard of millimeter wave wireless personal area network (PAN) is being developed as IEEE802.15.3c.

There are several transmission schemes for transmitting a high-definition video. In order to receive signals in a plurality of transmission schemes, a receiver has to have the receivers corresponding to the respective transmission schemes. However, the circuit size of the receiver is expanded in accordance with the number of transmission schemes to be supported.

SUMMARY

It is therefore an object of the present invention to reduce the circuit size of a receiver for receiving signals in a plurality of transmission schemes.

According to an example embodiment of the present disclosure, a receiver for receiving a baseband signal and a modulated signal includes: a first phase-locked loop (PLL) circuit configured to generate a first internal clock based on an external clock synchronized with the baseband signal; a demodulator configured to demodulate the modulated signal to output the demodulated signal; a selector configured to select one of the baseband signal or the demodulated signal; and a first clock data recovery (CDR) circuit configured to generate a recovered clock and recovered data from the signal selected by the selector, by using the first internal clock.

According to the example embodiment of the present disclosure, the selector selects one from the baseband signal and the demodulated signal, and the first CDR circuit generates a recovered clock and recovered data from the signal selected by the selector. Therefore, the first CDR circuit is alone able to process both baseband and demodulated signals. As a result, the circuit size of the receiver for receiving both baseband and demodulated signals is reduced successfully, thereby reducing the size of the semiconductor chip which implements the receiver.

According to another example embodiment of the present disclosure, a signal processing apparatus includes: a receiver configured to receive a baseband signal and a modulated signal to obtain a recovered clock and recovered data; and a signal processor configured to generate a video signal from the recovered clock and the recovered data. The receiver includes a first PLL circuit configured to generate a first internal clock based on an external clock synchronized with the baseband signal; a demodulator configured to demodulate the modulated signal to output the demodulated signal; a selector configured to select one of the baseband signal or the demodulated signal; and a first CDR circuit configured to generate the recovered clock and the recovered data from the signal selected by the selector, by using the first internal clock. The receiver and the signal processor are formed on a single semiconductor chip.

According to still another example embodiment of the present disclosure, a video display apparatus includes: a receiver configured to receive a baseband signal and a modulated signal to obtain a recovered clock and recovered data; a signal processor configured to generate a video signal from the recovered clock and the recovered data; and a display configured to display video represented by the video signal. The receiver includes a first PLL circuit configured to generate a first internal clock based on an external clock synchronized with the baseband signal; a demodulator configured to demodulate the modulated signal to output the demodulated signal; a selector configured to select one of the baseband signal or the demodulated signal; and a first CDR circuit configured to generate the recovered clock and the recovered data from the signal selected by the selector, by using the first internal clock.

According to the example embodiments of the present disclosure, the circuit size of a receiver for receiving signals in a plurality of transmission schemes is reduced. Therefore, the size of the semiconductor chip which implements the receiver is also reduced, thereby reducing manufacturing costs of the receiver.

DETAILED DESCRIPTION

Figure 1:
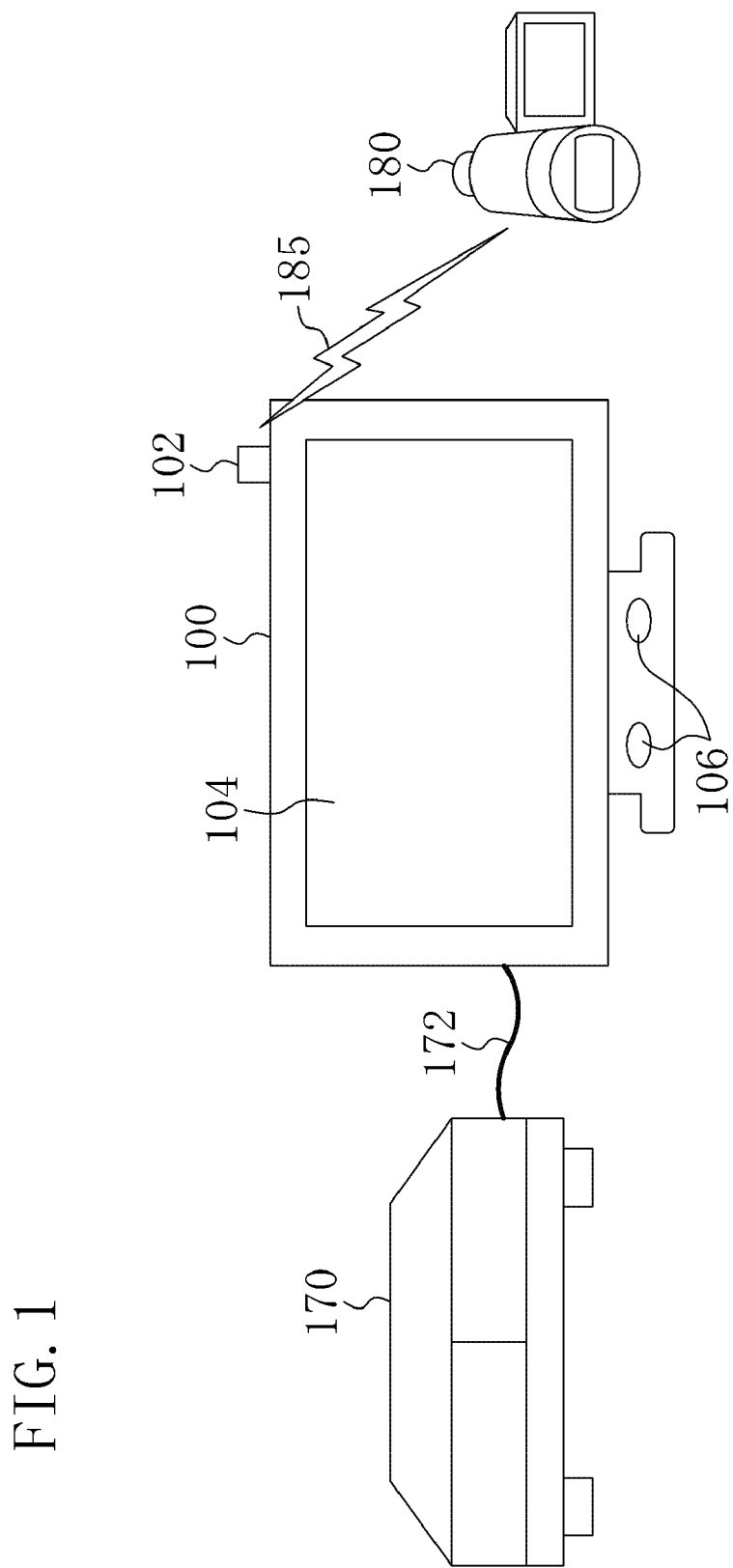
FIG. 1 is a schematic diagram illustrating a video display according to an example embodiment, and a video transmitter for transmitting video thereto.

The example embodiments of the present disclosure will be described below with reference to the accompanying drawings. In the drawings, the elements which are assigned the same last two digits in their reference numbers correspond to each other, and the elements are identical or similar to each other. Solid lines between functional blocks in the drawings represent electrical connections.

In this disclosure, the term "modulated signal" refers to any signal to be used in the ultra wide band wireless systems (hereinafter referred to as a "UWB signal"). The Federal Communications Commission (FCC) of the United States defines a UWB signal as a radio signal having a bandwidth exceeding the smaller one of 500 MHz and 20% of its center frequency. Therefore, the term "modulated signal" used in this disclosure encompasses UWB signals defined by the FCC of the U.S.

Such a UWB signal includes both of a modulated carrier wave (or a signal having a carrier component), and an ultrashort pulse signal used in impulse radio systems. Specifically, examples of such modulated signals include signals adopted by the standards IEEE802.15.3a, IEEE802.15.3c, etc. such as multi-band orthogonal frequency division multiplexing (MB-OFDM), direct sequence UWB (DS-UWB), common signaling mode (CSM), etc.

Figure 3:
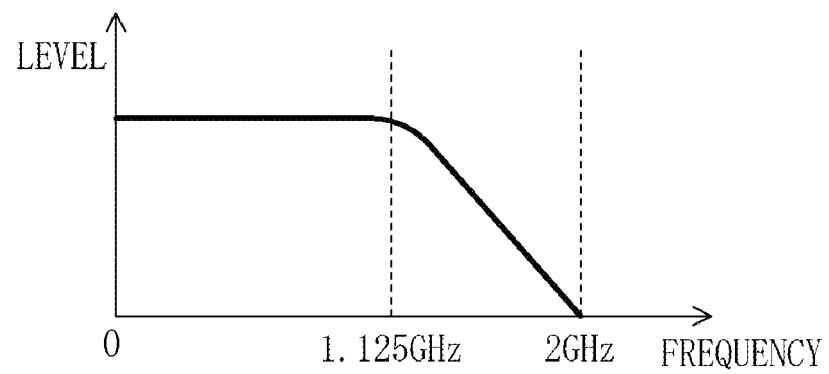
FIG. 3 is a graph illustrating an example of the spectrum of a signal B included in an HDMI signal received by an HDMI receiver of FIG. 2.
Figure 4:
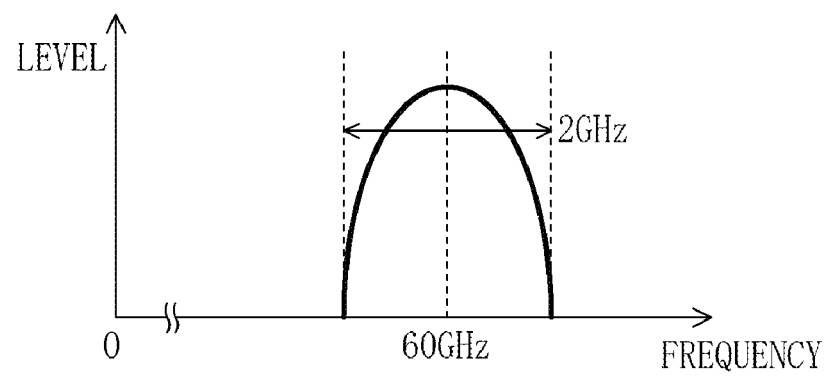
FIG. 4 is a graph illustrating an example of the spectrum of the UWB signal received by an antenna of FIG. 2.

In this disclosure, the term "UWB signal" refers to modulated signals similar to those illustrated in FIG. 4, but does not refer to baseband signals similar to those illustrated in FIG. 3. UWB signals may be, e.g., millimeter-wave radio signals.

In this disclosure, the term "baseband signal" refers to signals which contain no modulated carrier waves. In other words, a baseband signal is a signal which contains no carrier wave components. Examples of such baseband signals include channel-coded signals such as signals employing transition-minimized differential signaling (TMDS) adopted by the HDMI standard.

In this disclosure, each functional block can typically be implemented by hardware. For example, each functional block is formed on a semiconductor chip as part of an integrated circuit (IC). Here, examples of such an IC include large-scale integrated circuits (LSIs), application-specific integrated circuits (ASICs), gate arrays, field programmable gate arrays (FPGAs), etc. Alternatively, all or part of each functional block can be implemented by software. For example, such a functional block can be implemented by a program to be executed on a processor. In other words, each functional block described in this disclosure may be implemented by hardware, by software, or by any combination of hardware and software.

Overall System

The inventors of the present invention have invented an apparatus for receiving a baseband signal representing video through a cable, and for wirelessly receiving a modulated signal representing video, to display video based on at least one of the signals. Such a video display receives an HDMI signal output from a device such as a hard disk recorder (HDR) connected with wires including an HDMI cable, and displays the video image represented by the HDMI signal on a display. The video display receives a UWB signal output from a wirelessly connected device such as a digital camcorder, and displays the video image represented by the UWB signal on the display.

In the example discussed above, when the video display receives the HDMI signal and the UWB signal, the video display enables a user to manually select one of those signals. The video display displays video based on the selected signal. Alternatively, if the video display receives the UWB signal while displaying the video based on the HDMI signal, then the video display displays video based on the UWB signal.

In summary, the video display receives an HDMI signal and a UWB signal, and selectively displays one of the two signals. Some elements for processing received signals in the video display process the signals in a plurality of transmission schemes. For example, a single clock data recovery (CDR) circuit in the video display selectively processes one signal included in an HDMI signal (complying with the HDMI standard, and typically referring to the four signals of R (red), G (green), B (blue), and clock collectively), and a UWB signal. This simplifies the configuration of the circuit for processing the HDMI signal and the UWB signal, thereby reducing the size of the semiconductor chip which implements the circuit.

Embodiments

FIG. 1 is a schematic diagram illustrating a video display apparatus 100 according to the example embodiment and a device for transmitting video thereto. The video display apparatus 100 includes an antenna 102, a display 104, and a powered speaker 106.

A playback device 170 outputs an HDMI signal for transmitting both video and audio data to the video display apparatus 100 through an HDMI cable 172. A digital camcorder 180 wirelessly transmits a UWB signal 185 for transmitting both video and audio data to the video display apparatus 100. The video display apparatus 100 selects either one of the different communications option HDMI or UWB, and displays the video carried by the signal of the selected option on the display 104.

The playback device 170 outputs at least one of video or audio signal. Examples of the playback device 170 include hard disk recorders, Blu-ray disc players, DVD players, CD players, personal computers, and FM tuners. The following description relates to the case in which the video display apparatus 100 receives the UWB signal 185 transmitted from the digital camcorder 180. Instead of the digital camcorder 180, the video display apparatus 100 may receive the UWB signal transmitted from any device as long as it outputs at least one of video or audio signal, such as a digital camera, portable audio playback device, portable video playback device, a mobile phone, a hard disk recorder, a Blu-ray disc player, a DVD player, a CD player, a personal computer, or an FM tuner.

Figure 2:
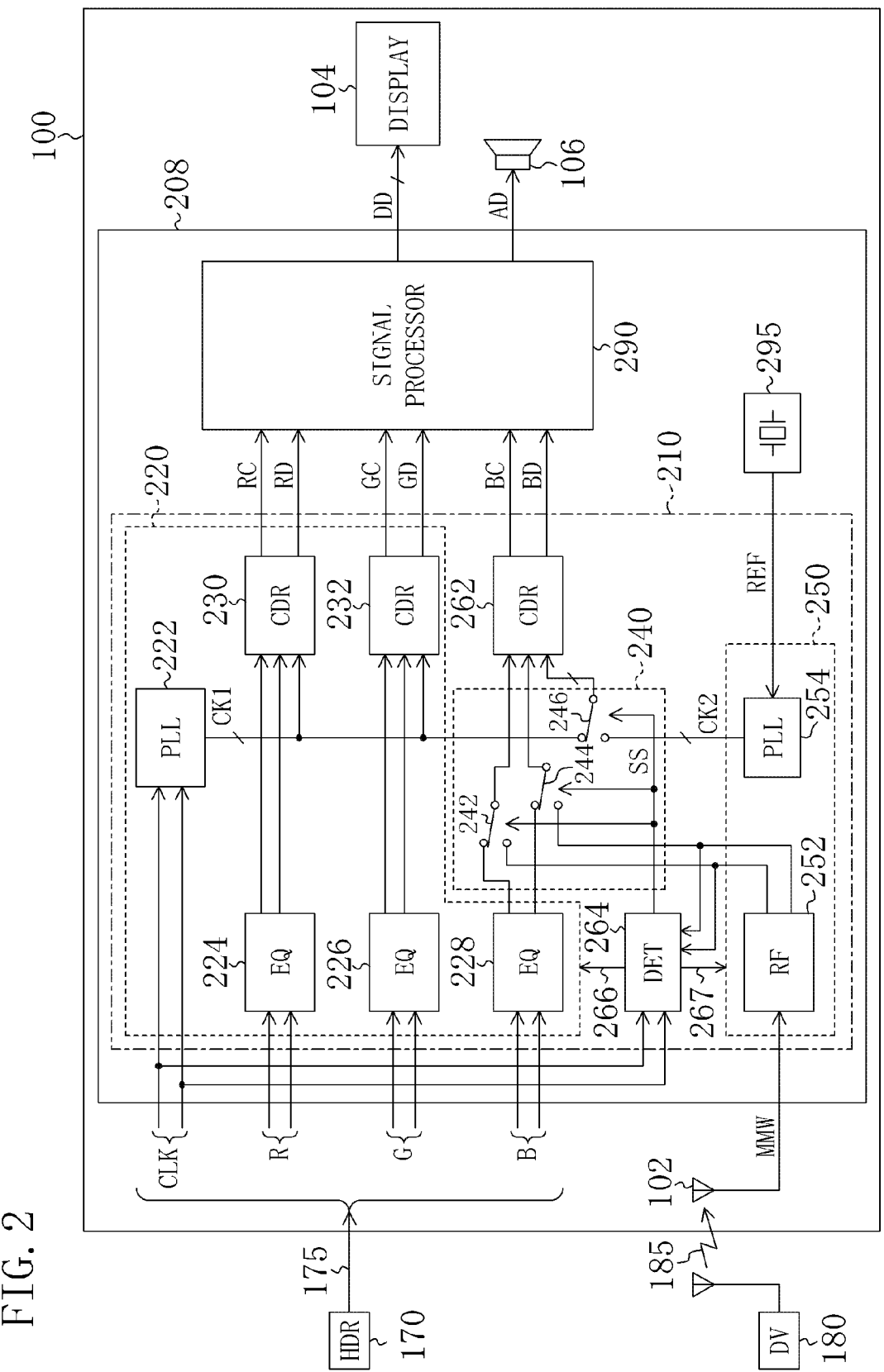
FIG. 2 is a block diagram illustrating the configuration of the video display of FIG. 1.

FIG. 2 is a block diagram illustrating the configuration of the video display apparatus 100 of FIG. 1. The video display apparatus 100 includes the antenna 102, a signal processing section 208, a display 104, and the powered speaker 106. The video display apparatus 100 is a television set, for example. The signal processing section 208 is included in such a television set.

Both the HDMI signal 175 transmitted from the playback device 170 through the HDMI cable 172, and the UWB signal 185 output from the digital camcorder 180 may represent only either one of video and audio data. Both the HDMI signal 175 and the UWB signal 185 may carry both of video and audio data, and may carry data other than video and audio data.

The signal processing section 208 includes a receiver 210, a signal processor 290, and an oscillator 295. Typically, the receiver 210 is formed on a single semiconductor chip as a single LSI circuit. The receiver 210, the signal processor 290, and the oscillator 295 are typically mounted on a printed circuit board. The receiver 210 and the signal processor 290 may be arranged on a single semiconductor chip as a single integrated circuit such as an LSI circuit.

The receiver 210 includes an HDMI receiver 220, a selector 24, a UWB receiver 250, a CDR circuit 262, and a detector 264. The HDMI receiver 220 includes a phase-locked loop (PLL) circuit 222, equalizers 224, 226, and 228, and a CDR circuits 230 and 232. The selector 240 includes switches 242, 244, and 246.

The HDMI receiver 220 receives an HDMI signal 175 representing video data, from the playback device 170 through the HDMI cable 172. The HDMI signal 175 includes signals R, G, and B as baseband signals, and a clock CLK. The clock CLK is synchronized with the signals R, G, and B. The clock CLK is transmitted by a TMDS clock channel. The signals R, G, and B are transmitted by TMDS data channels 0, 1, and 2, respectively.

FIG. 3 is a graph illustrating an example of the spectrum of the signal B included in the HDMI signal 175 received by the HDMI receiver 220 of FIG. 2. The signals R and G have the same spectrum. As illustrated in FIG. 3, the signals R, G, and B are baseband signals. In this case, for example, the signals R, G, and B have a data transfer rate of 2.25 Gbps, and the frequency of the clock CLK is 225 MHz. However, the data transfer rate of the signals R, G, and B included in the HDMI signal, and the frequency of the clock CLK are not limited to these specific values. Any suitable data transfer rate and frequency may be employed.

The signals R, G, and B represent R, G, and B components of video data, respectively. The video data typically represents moving images, but may also represent still images. Alternatively, the HDMI receiver 220 may receive signals representing the luminance component and the color-difference components of the video. In general, the HDMI receiver 220 may receive any signal for serially transmitting video data. In other words, the HDMI receiver 220 may receive a signal representing video other than the HDMI signal, together with the corresponding clock, as a serial signal.

Each of the signals R, G, and B, and the clock CLK may be implemented by a differential signal of the TMDS method. In the TMDS method, typically, each signal is transmitted through a pair of two signal lines and one ground line. In FIG. 2, the ground line is omitted for simplicity. The TMDS method is known as a technique for high-speed serial data transmission. In the TMDS method, each bit is converted into a differential signal for transmission so that the transition in signal level is reduced.

The equalizer 224 equalizes the signal R, and then outputs the equalized differential signal to the CDR circuit 230. The equalizer 226 equalizes the signal G, and then outputs the equalized differential signal to the CDR circuit 232. The equalizer 228 equalizes the signal B, and then outputs the equalized differential signal to the switches 242 and 244. The equalizers 224, 226, and 228 reduce or remove attenuation and jitter caused by the cable, and improve signal amplitude and signal eye patterns.

The PLL circuit 222 generates an internal clock CK1 based on the clock CLK. The internal clock CK1 is a multi-phase clock (e.g., a nine-phase clock), and the frequency thereof is equal to an integral multiple of that of the clock CLK. The clock CLK transmitted on the signal line is also affected by attenuation and jitter caused by the cable. Therefore, the PLL circuit 222 may have the same function as the equalizers 224, 226, and 228. Alternatively, another equalizer (not illustrated) may be provided before the PLL circuit 222.

The CDR circuit 230 generates a recovered clock RC and recovered data RD from the differential signal equalized by the equalizer 224, by using the internal clock CK1, and then outputs the generated recovered clock RC and the generated recovered data RD to the signal processor 290. The CDR circuit 232 generates a recovered clock GC and recovered data GD from the differential signal equalized by the equalizer 226, by using the internal clock CK1, and then outputs the generated recovered clock GC and the recovered data GD to the signal processor 290.

FIG. 4 is a graph illustrating an example of the spectrum of the UWB signal 185 received by the antenna 102 of FIG. 2. The UWB signal is obtained, for example, by on-off keying (OOK) modulating a carrier wave having a frequency of 60 GHz. Specifically, the UWB signal has a data transfer rate of 1.728 Gbps, a center frequency of the spectrum at about 60 GHz, and a bandwidth of about 2 GHz.

A radio signal received by the antenna 102 may generally be any signal to be processed by the signal processor 290. Examples of such a signal include the UWB signal 185 output by the digital camcorder 180, which typically represents audio and video data.

However, examples of the signal received by the antenna 102 include signals obtained by modulating a carrier wave in schemes such as Amplitude Shift Keying (ASK) modulation, Binary Phase Shift Keying (BPSK) modulation, Quadrature Phase Shift Keying (QPSK) modulation, and Orthogonal Frequency Division Multiplexing (OFDM) modulation. Examples of the signal received by the antenna 102 also include an impulse radio signal. The data transfer rate, the center frequency of the spectrum, and the bandwidth of the signal received by the antenna 102 are not limited to the specific values. Any suitable data transfer rate, center frequency of the spectrum, and bandwidth may be employed.

The UWB receiver 250 includes a demodulator 252 and a PLL circuit 254. The antenna 102 receives, for example, a UWB signal 185 having the spectrum illustrated in FIG. 4, and then provides the received signal to the demodulator 252 as a UWB signal MMW.

The demodulator 252 demodulates the UWB signal MMW, and then outputs the demodulated signal to the switches 242 and 244 and the detector 264 as a differential signal. If the UWB signal MMW is an OOK-modulated signal, the demodulator 252 demodulates the UWB signal MMW by envelope detection. Although the demodulator 252 for the UWB signal MMW is employed in the example embodiment, any suitable demodulator may be employed depending on UWB signals to be received.

The PLL circuit 254 receives a reference signal REF from the oscillator 295. The reference signal REF is a signal generated by using, e.g., a quartz crystal. The frequency of the reference signal REF is 24 MHz, for example. The PLL circuit 254 generates an internal clock CK2 based on the reference signal REF. The internal clock CK2 is a multi-phase clock (e.g., a nine-phase clock), and the frequency thereof is equal to an integral multiple of that of the reference signal REF. In FIG. 2, the reference signal REF is given by the oscillator 295 outside the receiver 210. The oscillator 295 is, e.g., an oscillator which oscillates based on the vibration of a quartz crystal.

The receiver 210 may partially include the oscillator 295 for generating the reference signal REF. The receiver 210 may include a self oscillator which has no quartz crystal. In this case, the receiver 210 uses the reference signal REF generated by the self oscillator. The reference signal REF may be given from the outside of the signal processing section 208, and may be given from the outside of the video display apparatus 100.

The detector 264 determines which signal is input, the HDMI signal or the UWB signal, and then generates a selection signal SS depending on the determination result. Specifically, if the clock CLK has been input, the detector 264 determines that the HDMI signal has been input. If the signal demodulated in the demodulator 252 has been input, the detector 264 determines that the UWB signal has been input. For example, if the UWB signal MMW is an OOK-modulated signal, the signal demodulated in the demodulator 252 represents the envelope detection result of the UWB signal MMW. Therefore, the detector 264 easily detects whether or not the demodulated signal has been input, based on the amplitude of the signal demodulated in the demodulator 252. The detector 264 generates a selection signal SS depending on the determination result, and outputs the selection signal SS to the switches 242, 244, and 246.

The detector 264 generates a selection signal SS for selecting the UWB signal if the signal demodulated in the demodulator 252 has been input. The detector 264 generates a selection signal SS for selecting the HDMI signal if the clock CLK has been input. The detector 264 gives higher priority to the UWB signal than the HDMI signal for selection. Specifically, the detector 264 generates a selection signal SS for selecting the UWB signal if the signal demodulated in the demodulator 252 has been input. The detector 264 generates a selection signal SS for selecting the HDMI signal if no signal demodulated in the demodulator 252 has been input. In other word, the detector 264 generates a selection signal SS for selecting the UWB signal if both the clock CLK and the signal demodulated in the demodulator 252 have been input.

Both of the switches 242 and 244 receive the differential signal equalized in the equalizer 228 and the signal demodulated in the demodulator 252, select one from the received signals based on the selection signal SS, and then output the selected signal to the CDR circuit 262. Specifically, the switches 242 and 244 select and output the differential signal equalized by the equalizer 228 if the selection signal SS indicates the selection of the HDMI signal. The switches 242 and 244 select and output the signal demodulated in the demodulator 252 if the selection signal SS indicates the selection of the UWB signal.

The switch 246 receives the internal clocks CK1 and CK2, selects one from the received signals based on the selection signal SS, and then outputs the selected signal to the CDR circuit 262. Specifically, the switch 246 selects and outputs the internal clock CK1 if the selection signal SS indicates the selection of the HDMI signal. The switch 246 selects and outputs the internal clock CK2 if the selection signal SS indicates the selection of the UWB signal.

The CDR circuit 262 generates a recovered clock BC and recovered data BD from the signal selected by the switches 242 and 244, by using the internal clock selected by the switch 246, and then outputs the generated recovered clock BC and the generated recovered data BD to the signal processor 290. In other words, the CDR circuit 262 generates a recovered clock BC and recovered data BD from the UWB signal MMW if the antenna 102 receives UWB signal 185 (specifically, if the demodulator 252 outputs the demodulated signal). The CDR circuit 262 generates a recovered clock BC and recovered data BD from the signal B included in the HDMI signal if the antenna 102 does not receive the UWB signal 185 (specifically, if the demodulator 252 does not output the demodulated signal).

The signal processor 290 generates a video signal DD and an audio signal AD from the recovered clocks RC, GC, and BC and the recovered data RD, GD, and BD obtained in the receiver 210. The display 104 receives the video signal DD generated by the signal processor 290, and displays the video represented by the video signal DD. The powered speaker 106 receives the audio signal AD output by the signal processor 290, and generates sounds.

In this configuration, the display 104 displays the video transmitted by the HDMI signal if the UWB signal 185 is not received. The display 104 displays the video transmitted by the UWB signal 185 if the UWB signal 185 is received. In other words, the signal processing section 208 makes a selection between the HDMI signal and the UWB signal without any user intervention, and outputs the selected signal to an external device.

Figure 5:
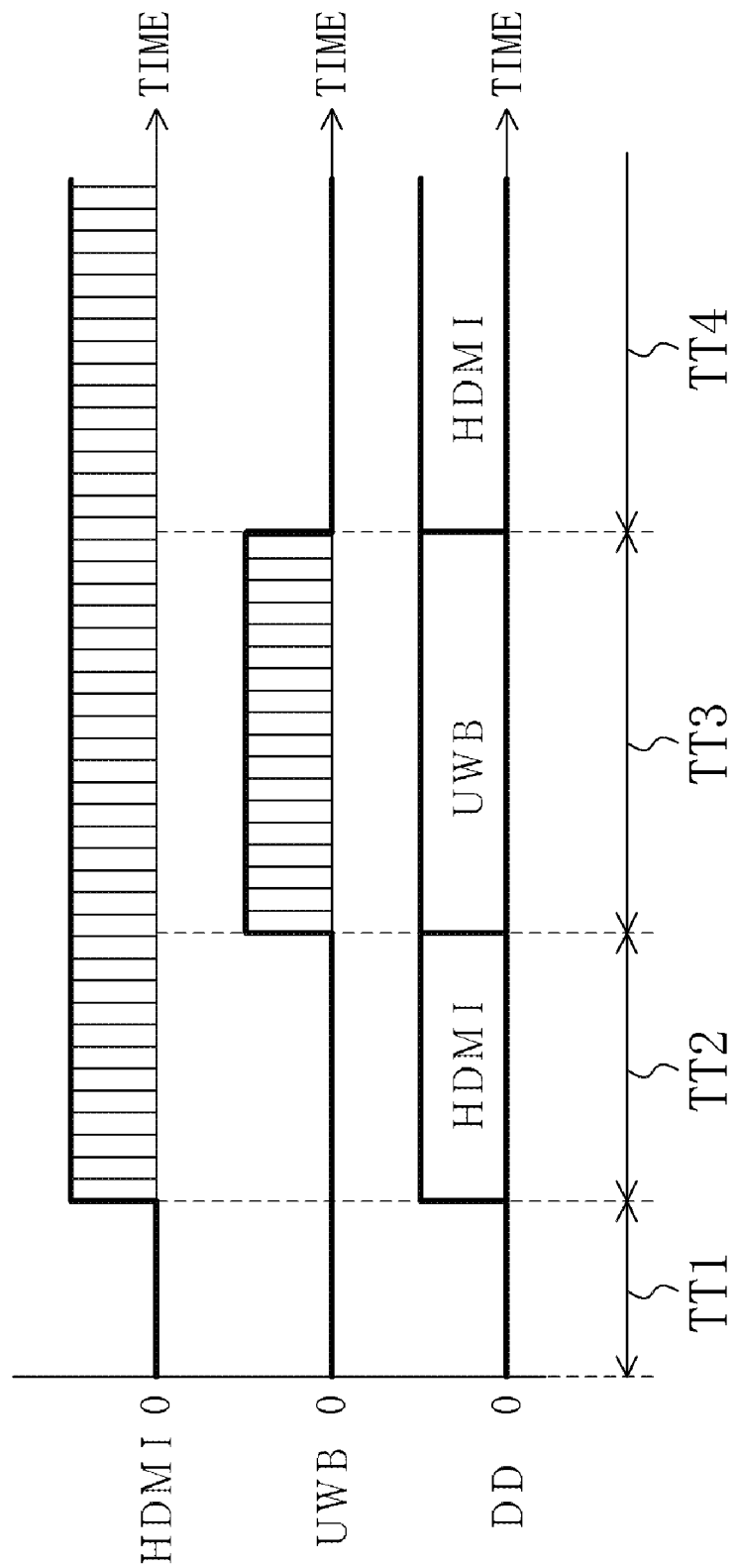
FIG. 5 is a timing diagram illustrating an example of the switching between signals output from a signal processor of FIG. 2.

FIG. 5 is a timing diagram illustrating an example of the switching between signals to be output from the signal processing section 208 of FIG. 2. In a period TT1 of FIG. 5, since neither the HDMI signal 175 nor the UWB signal 185 is input, the signal processing section 208 outputs no video signal DD. In a period TT2, the HDMI signal 175 is input, but the UWB signal 185 is not input. Therefore, the signal processing section 208 outputs a video signal DD based on the HDMI signal 175.

In a period TT3, since both of the HDMI signal 175 and the UWB signal 185 are input, the signal processing section 208 gives higher priority to the UWB signal 185 and outputs a video signal DD based on the UWB signal 185. In a period TT4, the HDMI signal 175 is input, but the UWB signal 185 is not input. Therefore, the signal processing section 208 outputs a video signal DD based on the HDMI signal 175 again.

In the receiver 210 of FIG. 2, when video is transmitted by the UWB signal 185 from a device which is not wired to the receiver 210 (e.g., the digital camcorder 180), the video is output to the display 104 for display. Therefore, the display 104 easily displays the video from an external device without cable connection.

The periods TT2 and TT3 have lengths of several seconds to dozens of minutes, but any suitable length may be employed. If the processing speeds of the receiver 210 and the signal processor 290 are high enough, the HDMI signal and the UWB signal are switched every several milliseconds for time division multiplexing. In this case, the signal processor 290 may output the video transmitted by the HDMI signal and the video transmitted by the UWB signal together so that the display 104 displays these videos at the same time.

Power management may be performed on the HDMI receiver 220 and the UWB receiver 250. If the signal demodulated in the demodulator 252 is input, the detector 264 outputs a power management signal 266 to the HDMI receiver 220 to stop the operation thereof, and outputs a power management signal 267 to the UWB receiver 250 to perform the operation thereof at the same time. In this case, at least a part of the HDMI receiver 220 stops its operation. Specifically, at least one of the PLL circuit 222, or the CDR circuits 230 and 232 is stopped. Furthermore, the operations of the equalizers 224, 226, and 228 may be stopped.

If the signal demodulated in the demodulator 252 is not input, and if the clock CLK is input, the detector 264 outputs the power management signal 266 to the HDMI receiver 220 to perform the operation thereof, and outputs the power management signal 267 to the UWB receiver 250 to stop the operation thereof. In this case, at least a part of the UWB receiver 250 stops its operation. Specifically, at least one of the demodulator 252 or the PLL circuit 254 is stopped.

Specifically, if both of the clock CLK and the signal demodulated in the demodulator 252 are input, the detector 264 outputs the power management signal 266 to the HDMI receiver 220 to stop the operation thereof, and outputs the power management signal 267 to the UWB receiver 250 to perform the operation thereof. This power management reduces the power consumption of the receiver 210.

Only in the case when neither the clock CLK nor the signal demodulated in the demodulator 252 is input, the PLL circuit 222 or the PLL circuit 254 may be stopped.

Although priority is given to the UWB signal for selection in the foregoing description, priority may be given to the HDMI signal for selection. Specifically, if the clock CLK is input, the detector 264 may generate a selection signal SS for selecting the HDMI signal. Otherwise, the detector 264 may generate a selection signal SS for selecting the UWB signal. In other word, if both of the clock CLK and the signal demodulated in the demodulator 252 are input, the detector 264 generates a selection signal SS for selecting the HDMI signal. Therefore, regardless of the UWB signal, for example, at the set time, the HDMI signal output from the playback device 170 is selected so that the video of the HDMI signal is displayed on the display 104.

If priority is given to the HDMI signal for selection, the following power management is performed. If the clock CLK is input, the detector 264 outputs the power management signal 266 to the HDMI receiver 220 to perform the operation thereof, and outputs the power management signal 267 to the UWB receiver 250 to stop the operation thereof. In this case, at least a part of the UWB receiver 250 stops its operation.

If the clock CLK is not input, and if the signal demodulated in the demodulator 252 is input, then the detector 264 outputs the power management signal 266 to the HDMI receiver 220 to stop the operation thereof, and outputs the power management signal 267 to the UWB receiver 250 to perform the operation thereof. In this case, at least a part of the HDMI receiver 220 stops its operation.

Specifically, if both of the clock CLK and the signal demodulated in the demodulator 252 are input, the detector 264 outputs the power management signal 266 to the HDMI receiver 220 to perform the operation thereof, and outputs the power management signal 267 to the UWB receiver 250 to stop the operation thereof.

Although the detector 264 determines whether the clock CLK is input in the foregoing description, the detector 264 may determine whether one of the baseband signals R, G, and B is input. This is because determination may be made based only on any one of the clock CLK and the signals R, G, and B included in the HDMI signal. The detector 264 may detect the output from one of the equalizers 224, 226, and 228 instead of the clock CLK.

If the HDMI signal includes a luminance signal and color-difference signals, the detector 264 may determine whether a signal from one of the three TMDS data channels for transmitting the luminance and color-difference signals is input.

Although the signals R, G, and B, the clock CLK, the outputs of the equalizers 224, 226, and 228, and the output of the demodulator 252 are differential signals in the foregoing description, these signals may be single ended signals or signals in any suitable form.

Although the video display apparatus 100 includes the antenna 102 outside the signal processing section 208 in the foregoing description, the signal processing section 208 may include the antenna 102 so that the antenna 102 is on the printed circuit board on which the receiver 210, etc. are mounted. In this case, the antenna 102 may be a wiring pattern formed on the printed circuit board.

The receiver 210 and the antenna 102 may be formed on a single semiconductor chip as an LSI circuit. If a millimeter wave signal or a signal having a frequency close thereto is received, the size of the antenna 102 often ranges from several millimeters to dozens of millimeters. Therefore, the antenna 102 can be formed on the same semiconductor chip as the receiver 210. When the receiver 210 and the antenna 102 are formed on a single semiconductor chip, the transmission losses of received signals are reduced, and the signals input to the receiver 210 are stabilized, thereby improving the reception performance of the receiver 210. The number of parts becomes smaller, thereby reducing the production costs.

First Modification

Figure 6:
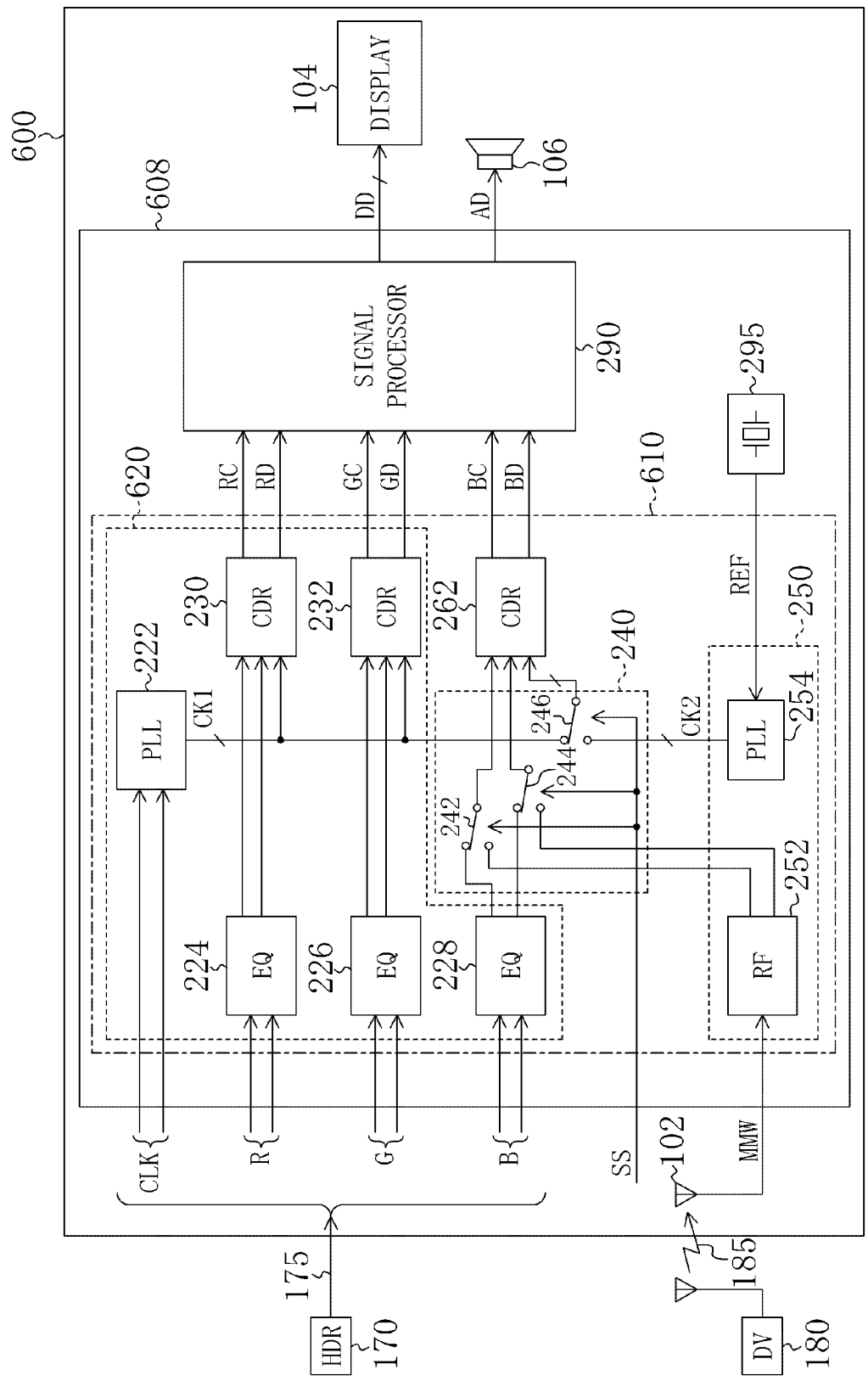
FIG. 6 is a block diagram illustrating the configuration of a video display according to a first modification to the example embodiment.

FIG. 6 is a block diagram illustrating the configuration of a video display apparatus 600 according to a first modification to the example embodiment. The video display apparatus 600 has almost the same configuration as the video display apparatus 100 of FIG. 2, except that the detector 264 is not included in the video display apparatus 600. A signal processor 608 corresponds to the signal processing section 208. A selection signal SS is given to the selector 240 from the outside of a receiver 610. The selector 240 makes a selection based on the selection signal SS.

For example, the video display apparatus 600 includes a switch wired to the selector 240 outside the receiver 610. The switch, which is provided on the case of the video display apparatus 600, outputs a selection signal SS. A user may set the selection signal SS by operating the switch directly, or by using a wireless remote controller. In this case, the wireless remote controller transmits information, for example, through infrared rays or radio waves. Alternatively, the selection signal SS may be given from the outside of the video display apparatus 600.

In this configuration, the display 104 displays the video transmitted by the signal selected by the selection signal SS from the HDMI signal 175 and the UWB signal 185. In other words, the signal processor 608 selects one from the HDMI signal 175 and the UWB signal 185 based on the user's operation or the signal from the outside of the video display apparatus 600, and then outputs the selected signal to an external device.

Second Modification

Figure 7:
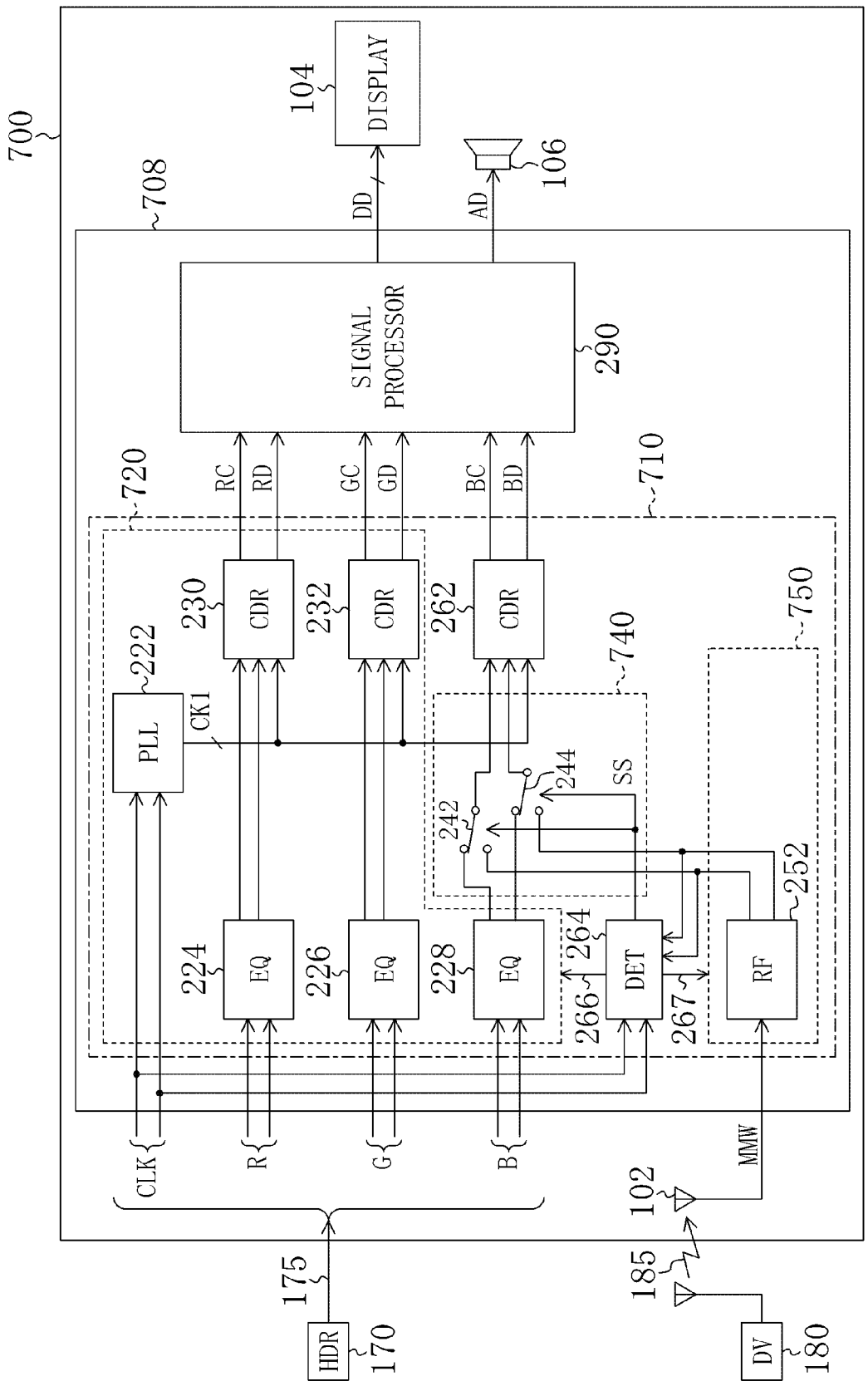
FIG. 7 is a block diagram illustrating the configuration of a video display according to a second modification to the example embodiment.

FIG. 7 is a block diagram illustrating the configuration of a video display apparatus 700 according to a second modification to the example embodiment. The video display apparatus 700 has almost the same configuration as the video display apparatus 100 of FIG. 2, except that the switch 246, the PLL circuit 254, and the oscillator 295 are not included in the video display apparatus 700. A signal processor 708 corresponds to the signal processing section 208.

Regardless of a selection signal SS, the CDR circuit 262 receives an internal clock CK1 generated in the PLL circuit 222, generates a recovered clock BC and recovered data BD from signal selected by the switches 242 and 244 by using the internal clock CK1, and then outputs the generated recovered clock BC and the generated recovered data BD to the signal processor 290. Since the internal clock CK1 is a multiphase clock, even when there is a variation in the data transfer rates of the signal selected by the switches 242 and 244, the CDR circuit 262 can perform operation. In the video display apparatus 700, the PLL circuit 254 and the oscillator 295 are unnecessary. Therefore, the video display apparatus 700 has a configuration simpler than that of the video display apparatus 100 of FIG. 2.

Instead of the clock CLK, the PLL circuit 222 may receive a reference signal REF having a frequency of 24 MHz, for example. In this case, the PLL circuit 222 generates an internal clock CK1 based on the reference signal REF. The internal clock CK1 is a multi-phase clock (e.g., a nine-phase clock), and the frequency thereof is equal to an integral multiple of that of the reference signal REF.

The receiver 710 may further include a switch for selecting one from the clock CLK and the reference signal REF to output the selected signal to the PLL circuit 222. The switch selects the clock CLK if the selection signal SS indicates the selection of the HDMI signal. The switch selects the reference signal REF if the selection signal SS indicates the selection of the UWB signal. This configuration stabilizes the operation of the CDR circuit 262.

Third Modification

Figure 8:
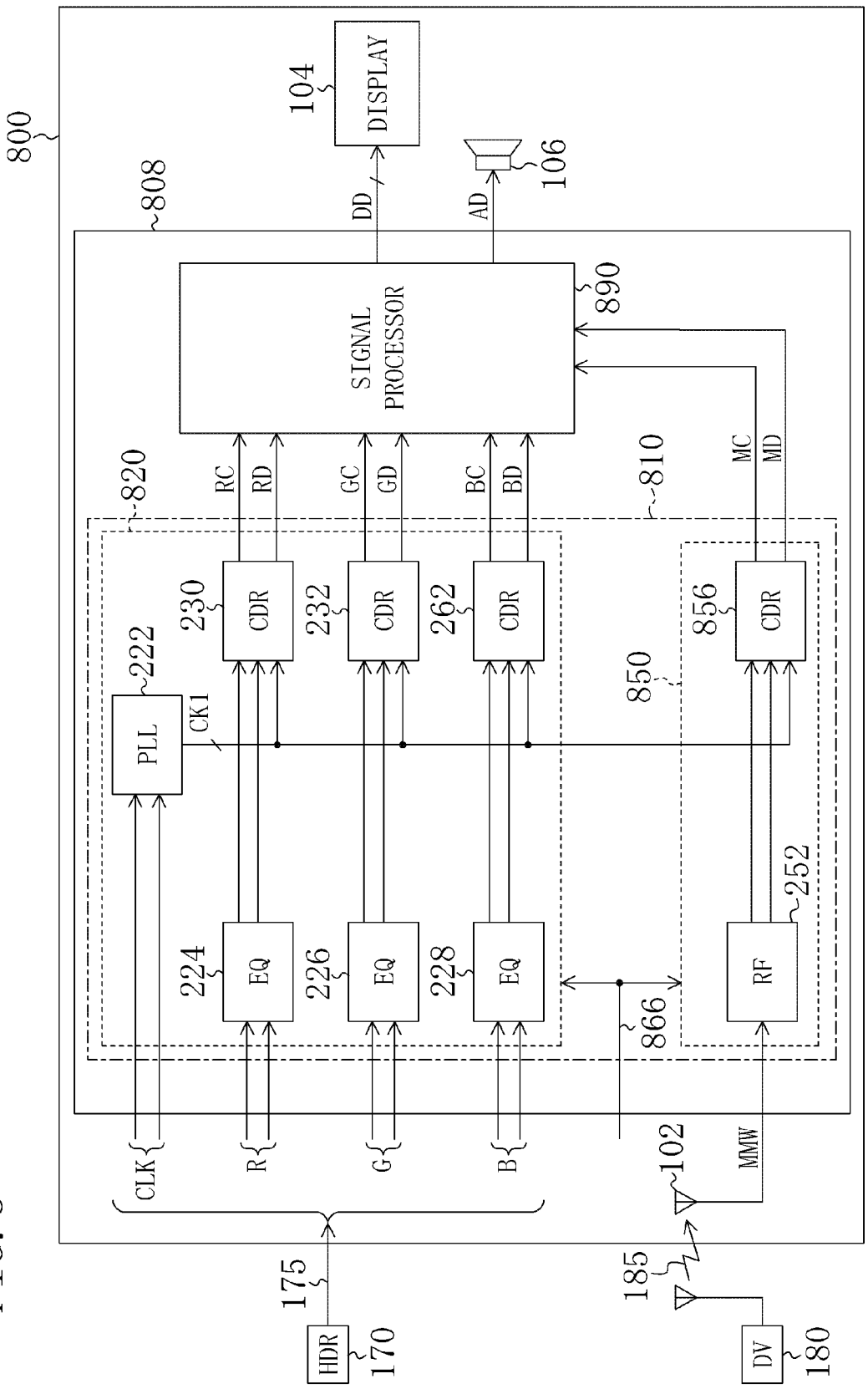
FIG. 8 is a block diagram illustrating a video display according to a third modification to the example embodiment.

FIG. 8 is a block diagram illustrating the configuration of a video display apparatus 800 according to a third modification of the example embodiment. The video display apparatus 800 has almost the same configuration as the video display apparatus 700 of FIG. 7, except that the video display apparatus 800 further includes a CDR circuit 856 without the detector 264 and the selector 740. A signal processor 808 corresponds to the signal processing section 208. An HDMI receiver 820 includes the CDR circuit 262. A UWB receiver 850 includes the CDR circuit 856.

The CDR circuit 262 generates a recovered clock BC and recovered data BD from the differential signal equalized by an equalizer 228, by using an internal clock CK1, and then outputs the generated recovered clock BC and the generated recovered data BD to a signal processor 890. The CDR circuit 856 generates a recovered clock MC and recovered data MD from the signal demodulated in the demodulator 252, by using the internal clock CK1, and then outputs the generated recovered clock MC and the generated recovered data MD to the signal processor 890. The signal processor 890 generates a video signal DD and an audio signal AD by appropriately using the recovered clocks RC, GC, and BC and the recovered data RD, GD, and BD based on an HDMI signal, as well as the recovered clock MC and the recovered data MD based on a UWB signal.

In the video display apparatus 800, since the CDR circuit 262 and the CDR circuit 856 are operable at the same time, the HDMI signal and the UWB signal are received and processed at the same time. Therefore, the display 104 can display the video transmitted by the HDMI signal and the video transmitted by the UWB signal thereon at the same time. In addition, one PLL circuit is good enough, thereby reducing the circuit size.

Power management may be performed on the HDMI receiver 820 and the UWB receiver 850. If the HDMI signal and the UWB signal do not have to be received at the same time, the operation of one of the HDMI receiver 820 or the UWB receiver 850 which is not used is stopped. Specifically, based on a power management signal 866 input from the outside of the receiver 810, at least one of the operations of the equalizer 224, 226, or 228, or the CDR circuit 230, 232, or 262 is stopped if the HDMI receiver 820 is not used, and at least one of the operations of the demodulator 252 or the CDR circuit 856 is stopped if the UWB receiver 850 is not used.

The power management signal 866 is given, for example, by a user's operation, to the HDMI receiver 820 and the UWB receiver 850. A detector for determining which signal is input, the HDMI signal or the UWB signal, may be employed so that the determination result thereof is employed as the power management signal 866.

As described above, according to the various embodiments of the present invention, manufacturing costs of a receiver is reduced. Therefore, the present invention is useful for receivers etc.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. A receiver for receiving a baseband signal and a modulated signal, comprising:
   a first phase-locked loop (PLL) circuit configured to generate a first internal clock based on an external clock synchronized with the baseband signal;
   a demodulator configured to demodulate the modulated signal to output the demodulated signal;
   a selector configured to select one of the baseband signal or the demodulated signal; and
   a first clock data recovery (CDR) circuit configured to generate a recovered clock and recovered data from the signal selected by the selector, by using the first internal clock.

2. The receiver of claim 1, further comprising a second PLL circuit configured to generate a second internal clock based on a reference signal, wherein
   the selector selects one from the first internal clock and the second internal clock, and
   the first CDR circuit generates the recovered clock and the recovered data, by using the internal clock selected by the selector.

3. The receiver of claim 2, further comprising a detector configured to determine which one of the baseband signal or the modulated signal is input thereinto, to generate a selection signal depending on the determination result, wherein
   the selector makes a selection based on the selection signal.

4. The receiver of claim 3, wherein
   If one of the external clock or the baseband signal is input into the detector, the detector generates the selection signal for selecting the baseband signal, and
   If the demodulated signal is input into the detector, the detector generates the selection signal for selecting the demodulated signal.

5. The receiver of claim 3, wherein if one of the external clock or the baseband signal is input into the detector, and if the demodulated signal is input thereinto, then the detector generates the selection signal for selecting the demodulated signal.

6. The receiver of claim 3, wherein if one of the external clock or the baseband signal is input into the detector, and if the demodulated signal is input thereinto, then the detector generates the selection signal for selecting the baseband signal.

7. The receiver of claim 3, further comprising a second CDR circuit configured to generate a recovered clock and recovered data from another baseband signal different from the baseband signal, wherein
   at least one of the first PLL circuit or the second CDR circuit is stopped if the demodulated signal is input to the detector.

8. The receiver of claim 3, wherein at least one of the demodulator or the second PLL circuit is stopped if one of the external clock or the baseband signal is input to the detector.

9. The receiver of claim 3, further comprising a second CDR circuit configured to generate a recovered clock and recovered data from another baseband signal different from the baseband signal, wherein
   at least one of the first PLL circuit or the second CDR circuit is stopped if one of the external clock or the baseband signal is input into the detector, and if the demodulated signal is input thereinto.

10. The receiver of claim 3, wherein at least one of the demodulator or the second PLL circuit is stopped if one of the external clock or the baseband signal is input into the detector and if the demodulated signal is input thereinto.

11. The receiver of claim 1, wherein the selector makes a selection based on a selection signal input from an outside of the receiver.

12. The receiver of claim 1, wherein
the baseband signal is a high-definition multimedia interface (HDMI) signal, and
the modulated signal is an ultra wide band (UWB) signal.

13. A receiver for receiving a baseband signal and a modulated signal, comprising:
a PLL circuit configured to generate an internal clock based on an external clock synchronized with the baseband signal;
a demodulator configured to demodulate the modulated signal to output the demodulated signal;
a first CDR circuit configured to generate a recovered clock and recovered data from the baseband signal, by using the internal clock; and
a second CDR circuit configured to generate a recovered clock and recovered data from the demodulated signal, by using the internal clock.

14. The receiver of claim 13, wherein
the baseband signal is an HDMI signal, and
the modulated signal is a UWB signal.

15. A signal processing apparatus, comprising:
a receiver configured to receive a baseband signal and a modulated signal to obtain a recovered clock and recovered data; and
a signal processor configured to generate a video signal from the recovered clock and the recovered data, wherein
the receiver includes
a first PLL circuit configured to generate a first internal clock based on an external clock synchronized with the baseband signal;
a demodulator configured to demodulate the modulated signal to output the demodulated signal;
a selector configured to select one of the baseband signal or the demodulated signal; and
a first CDR circuit configured to generate the recovered clock and the recovered data from the signal selected by the selector, by using the first internal clock, and
the receiver and the signal processor are formed on a single semiconductor chip.

16. A video display apparatus comprising:
a receiver configured to receive a baseband signal and a modulated signal to obtain a recovered clock and recovered data;
a signal processor configured to generate a video signal from the recovered clock and the recovered data; and
a display configured to display video represented by the video signal, wherein
the receiver includes
a first PLL circuit configured to generate a first internal clock based on an external clock synchronized with the baseband signal;
a demodulator configured to demodulate the modulated signal to output the demodulated signal;
a selector configured to select one of the baseband signal or the demodulated signal; and
a first CDR circuit configured to generate the recovered clock and the recovered data from the signal selected by the selector, by using the first internal clock.

17. The video display of claim 16, further comprising an antenna configured to receive the modulated signal to provide the modulated signal to the demodulator.

* * * * *